United States Patent [19]

Homma et al.

[11] Patent Number: 5,565,918
[45] Date of Patent: Oct. 15, 1996

[54] AUTOMATIC EXPOSURE CONTROL DEVICE WITH LIGHT MEASURING AREA SETTING

[75] Inventors: Hideo Homma, Tokyo; Kitahiro Kaneda, Kanagawa-ken; Kunihiko Yamada, Tokyo, all of Japan

[73] Assignee: Canon Kabushiki Kaisha, Tokyo, Japan

[21] Appl. No.: 245,414

[22] Filed: Jun. 24, 1994

Related U.S. Application Data

[62] Division of Ser. No. 865,632, Apr. 9, 1992, Pat. No. 5,339,163, which is a continuation of Ser. No. 323,300, Mar. 14, 1989, abandoned.

[30] Foreign Application Priority Data

Mar. 16, 1988 [JP] Japan .................................. 63-062690
Mar. 18, 1988 [JP] Japan .................................. 63-066946

[51] Int. Cl.[6] .................................................. H04N 5/238
[52] U.S. Cl. ............................................................ 348/364
[58] Field of Search .................................... 348/362, 363, 348/364, 366, 345; 354/410, 430; 250/208.1; H04N 5/238

[56] References Cited

U.S. PATENT DOCUMENTS

| | | | |
|---|---|---|---|
| 4,427,996 | 1/1984 | Tamura ................................... | 348/229 |
| 4,535,364 | 8/1985 | Hirobe ................................... | 348/364 |
| 4,638,367 | 1/1987 | Sakane et al. ......................... | 348/230 |
| 4,792,820 | 12/1988 | Norita et al. ......................... | 354/402 |
| 5,272,538 | 12/1993 | Homma et al. ....................... | 348/362 |

*Primary Examiner*—Wendy Garber
*Assistant Examiner*—Tuan V. Ho
*Attorney, Agent, or Firm*—Robin, Blecker, Daley & Driscoll

[57] ABSTRACT

An exposure control device includes an area setting circuit which sets a light measuring area on a part of an image sensing plane; a judging circuit which detects a back light image plane on the basis of a difference in level between video signals corresponding to the inside and the outside of the light measuring area; a high luminance detecting circuit which detects a high luminance part of the image sensing plane on the basis of the video signals; and a control circuit arranged to have the light measuring area set on the image sensing plane excluding the high luminance part from the light measuring area by controlling the area setting circuit on the basis of the output of the high luminance detection circuit when the image sensing plane is judged to be a back light image plane by the judging circuit. The device is arranged to attach weight to the average levels of the signals of the inside and the outside of the light measuring area according to the result of comparison of these signals, to add the weighted average signal levels together and to perform exposure control according to the result of addition.

32 Claims, 10 Drawing Sheets

AUTOMATIC EXPOSURE CONTROL DEVICE WITH LIGHT MEASURING AREA SETTING

This application is a division of application Ser. No. 07/865,632, filed Apr. 9, 1992 now U. S. Pat. No. 5,339,163 which is a continuation of Ser. No. 07/323,300, filed Mar. 14, 1989.

BACKGROUND OF THE INVENTION

1. Field of the Invention

This invention relates to an automatic exposure control device suited for a video camera or the like.

2. Description of the Related Art

The image sensing apparatuses such as a video camera, an electronic camera and the like have been arranged to automatically control their exposure operations. In the case of the video camera, for example, an automatic exposure control device controls the gain of a video signal to keep its level constant by means of the iris of an optical system and an automatic gain control (hereinafter referred to as AGC) circuit.

FIG. 1 of the accompanying drawings is a block diagram showing in outline the arrangement of a typical video camera including the conventional automatic exposure control device. In FIG. 1, a reference numeral 1 denotes a photo-taking lens. The light quantity of incident light passing through the lens 1 is adjusted by an iris 2. The light then comes to an image sensor 3 which is, for example, a CCD or the like and forms an image on the imaging plane of the image sensor 3. A buffer amplifier 4 which is disposed on the output side of the image sensor 3 produces a video signal 41. The video signal 41 is supplied to an AGC circuit 5 and a light measuring circuit 7a. The AGC circuit 5 controls the gain of the input signal to keep its output signal 51 at a constant level. The video signal 51 output from the AGC circuit 5 is supplied to a light measuring circuit 7b and a signal processing circuit 8. The signal processing circuit 8 then performs a signal processing operation including gamma correction, a blanking process, addition of synchronizing signals, etc. to convert the video signal into a standardized TV signal which is suited for display by a monitor, a video recorder or the like which is not shown. The processed signal is supplied to an output terminal OUT.

Light measuring circuits 7a and 7b are arranged in the same manner. They detect the signal levels of the video signals 41 and 51 and produce outputs 71a and 71b respectively. The output 71a of the circuit 7a is supplied to an iris driving circuit 6 which is arranged to control the aperture position of the iris 2. The out-put 71b of the circuit 7b is supplied to the gain control terminal 5a of the AGC circuit 5. The aperture of the iris 2 and the gain of the AGC circuit 5 are thus control-led to keep the video signal level constant.

The light measuring circuits 7a and 7b have hitherto been arranged as averaging circuits in general. This arrangement makes constant the luminance of the whole image plane on the average. In the event of a great difference in luminance between an object to be photographed and the background thereof, therefore, the image of the object is darkened all over under a back light condition or is whitened all over under a normal light condition. The image then becomes unnatural.

To avoid this, a weighted light measuring method of measuring light by attaching weight to a part of the image plane has been proposed. FIG. 4 shows by way of example the weighted light measuring method. In FIG. 4, a reference numeral 200 denotes a whole image plane. A numeral 201 denotes an object to be photographed. A numeral 202 denotes a light measuring area (or a light measuring frame) which is a weighted light measuring part of the image plane. If the object is located within this light measuring area, an exposure can be effected always appositely to the object without being much affected by the background. Hereinafter, this light measuring method will be called a frame-weighted light measuring method.

FIGS. 2 and 3 show an example of a light measuring circuit arranged in accordance with the frame-weighted light measuring method. The illustrations include light measuring circuits 9a and 9b and a light measuring area signal generating circuit 10. With the exception of them, the rest of the circuit is identical with the circuit of FIG. 1. Within the light measuring circuit 9a, an analog switch 901 is arranged to act as gate means for causing only a video signal part corresponding to the inside of the light measuring area (or frame) 202 of FIG. 4 to pass. The circuit 9a further includes low-pass filters 902 and 903, resistors 904 and 905, and a buffer amplifier 906. A video signal 41 is arranged to be supplied to the low-pass filter 902 and also to the other low-pass filter 903 via the analog switch 901. The analog switch 901 operates under the control of a control signal 101. The control signal 101 is a light measuring area setting gate signal. The level of the control signal 101 becomes high for the inside of the light measuring area 202 of FIG. 4. This control signal 101 is generated by the light measuring area signal generating circuit 10 of FIG. 2 as an H-V composite signal which is in synchronism with a synchronizing signal SYNC. The light measuring area setting signal generating circuit 10 is arranged to receive the synchronizing signal SYNC, to generate the light measuring area setting signal 101 and to cause thereby only the video signal part corresponding to the inside of the light measuring area 202 to pass. The low-pass filter 902 is arranged to produce an average value signal for the whole image plane. The low-pass filter 903 is arranged to produce an average value signal for the inside of the light measuring area 202. The two signals output from the low-pass filters 902 and 903 are weighted and added by the resistors 904 and 905 and then output from the buffer amplifier 906. In this instance, if the weight attaching degree of the low-pass filter 902 is larger than that of the other low-pass filter 903, the light measurement is performed in a manner close to averaging the light of the whole image plane. If the weight attaching ratio between them is reversed, light measurement is performed with weight attached to the inside of the light measuring area 202.

In accordance with the frame-weighted light measuring method described above, the level of the video signal suddenly drops to darken the whole image plane when a high luminance light source or the like either enters the light measuring frame or passes through there. In addition to this, in the event of a back light condition, the video signal level greatly changes for a change in the background part included in the light measuring frame. Besides, the object's image readily darkens all over when the object's image is small relative to the light measuring frame. In the case of the video camera which is used for obtaining a motion picture, therefore, the image plane becomes unstable giving a very unnatural impression in these instances.

Further, in the frame-weighted light measuring method, the weight attaching process of adding the signal level of the light measuring area (light measuring frame) to that of the whole image plane is fixedly carried out. Therefore, this method gives the same weighted light measuring characteristic both in a case where the signal level of the light measuring area is higher than that of the area outside of the light measuring area (a forward light state) and in an opposite case (a back light state).

However, in order to ensure an adequate exposure by carrying out the frame-weighted light measurement, the additive weight attaching value to be used for a normal light condition generally differs from the value to be used for a back light condition. If the weight attaching value remains fixed, it would be difficult to have an adequate exposure both under the normal light and back light conditions, Therefore, it has been impossible to completely remove the unnaturalness of the image in accordance with the conventional light measuring method.

Prior patent applications related to exposure control of this kind include U.S. patent application Ser. No. 264,204 filed on Oct. 28, 1988 and U.S. Pat. Application Ser. No. 312,962 filed on Feb. 21, 1989.

SUMMARY OF THE INVENTION

This invention is directed to the solution of the above-stated problem of the prior art. It is there-fore a first object of the invention to provide an expo-sure control device which is capable of always carrying out the most apposite exposure control irrespectively of the condition of an image sensing plane.

It is a second object of the invention to pro-vide an exposure control device which is capable of per-forming stable and natural exposure control in the following manner: Under a back light condition, frame-weighted light measurement is performed by using a light measuring area (a light measuring frame) excluding any high luminance part, so that the signal level never suddenly drops even when a high luminance light source or the like enters the light measuring area (or frame). Further, even in such a case that an object to be photographed is relatively small within the light measuring area with a high luminance background also included in the light measuring area under a back light condition, the device is capable of adequately performing exposure control to prevent the object from being photographed in a state of excessively darkened all over.

It is a third object of the invention to provide an exposure control device which is capable of appositely and stably carrying out weighted light measurement using a light measuring area irrespective of the image plane condition.

To attain this object, an exposure control device which is arranged as a preferred embodiment of the invention comprises: image sensing means for outputting an image signal corresponding to a sensed image; area setting means for setting a predetermined light measuring area on a part of an image sensing plane of the image sensing means; exposure control means for controlling an exposed state of the image sensing means by using an image signal corresponding to the inside of the light measuring area; high luminance detecting means for detecting a high luminance part on the image sensing plane on the basis of the image signal; and control means for controlling the area setting means on the basis of an output of the high luminance detecting means and for setting the light measuring area on the image sensing plane by excluding therefrom the high luminance part detected by the high luminance detecting means.

Further, a light measuring device which is arranged according to this invention as a preferred embodiment thereof to measure light on the basis of an image signal corresponding to a light measuring area set on an image sensing plane comprises: area setting means for setting the light measuring area on a part of the image sensing plane; judging means for judging a condition on the image sensing plane; high luminance detecting means for detecting a high luminance part on the image sensing plane on the basis of the image signal; and control means for compensating the light measuring area by controlling the area setting means according to an output of the judging means and that of the high luminance detecting means.

It is a fourth embodiment of the invention to provide an exposure control device which is capable of measuring light in a manner most suited for the state of an image plane in performing weighted light measurement with weight attached to an object located within a light measuring area, the device being arranged to make a discrimination between a back light condition and a normal light condition from a difference in signal level between the inside and the outside of the area.

It is a fifth object of the invention to provide an exposure control device which is capable of most appositely performing control under a normal light condition, under a back light condition and also according to a difference in luminance between the inside and the outside of a light measuring area under each of such conditions.

To attain these objects, a light measuring device arranged as a preferred embodiment of the invention comprises: image sensing means for outputting an image signal corresponding to a sensed image; area setting means for setting a predetermined detection area on a part of an image sensing plane of the image sensing means; light measuring means for measuring light on the basis of image signals weighted to predetermined degrees respectively corresponding to the inside and the outside of the detection area; judging means for judging a condition on the image sensing plane on the basis of image signals corresponding to the inside and the outside of the detection area; and control means for varying the degrees of weighting the image signals corresponding to the inside and the outside of the detection area in accordance with an output of the judging means.

Further, an exposure control device which is arranged as another preferred embodiment of the invention comprises: area setting means for setting a predetermined detection area on an image sensing plane; exposure control means for controlling an exposing operation on the image sensing plane on the basis of the result of a computing operation on signal levels of image signals corresponding to the inside and the outside of the detection area; judging means or judging a condition on the image sensing plane on the basis of the image signals corresponding to the inside and the outside of the detection area; and compensating means for compensating a computing operation on the image signals corresponding to the inside and the outside of the detection area.

It is a sixth object of the invention to provide a video camera which is capable of most appositely per-forming exposure control irrespectively of the state of the object to be photographed.

To attain the above-stated object, a video camera arranged according to this invention as a prefer-red embodiment thereof comprises: image sensing means for outputting an image signal corresponding to a sensed image; area setting means for setting a predetermined detection area on a part of an image sensing plane of the image sensing means; expo-sure control means for controlling an average level of the image signal to be kept constant by controlling a quantity of light incident on the image sensing means and/or a gain of a circuit which processes the image signal, on the basis of image signals weighted to predetermined degrees corresponding to the inside and the outside of the detection area; judging means for judging a condition on the image sensing plane on the basis of the image signals corresponding to the inside and the outside of the detection area; and exposure compensating means for compensating an exposure controlling quantity of the exposure control means by varying the degrees of weighting to the image signals corresponding to the inside and the outside of the detection area.

The above and other objects and features of the invention will become apparent from the following detailed description of embodiments thereof taken in connection with the accompanying drawings.

Figure 1:
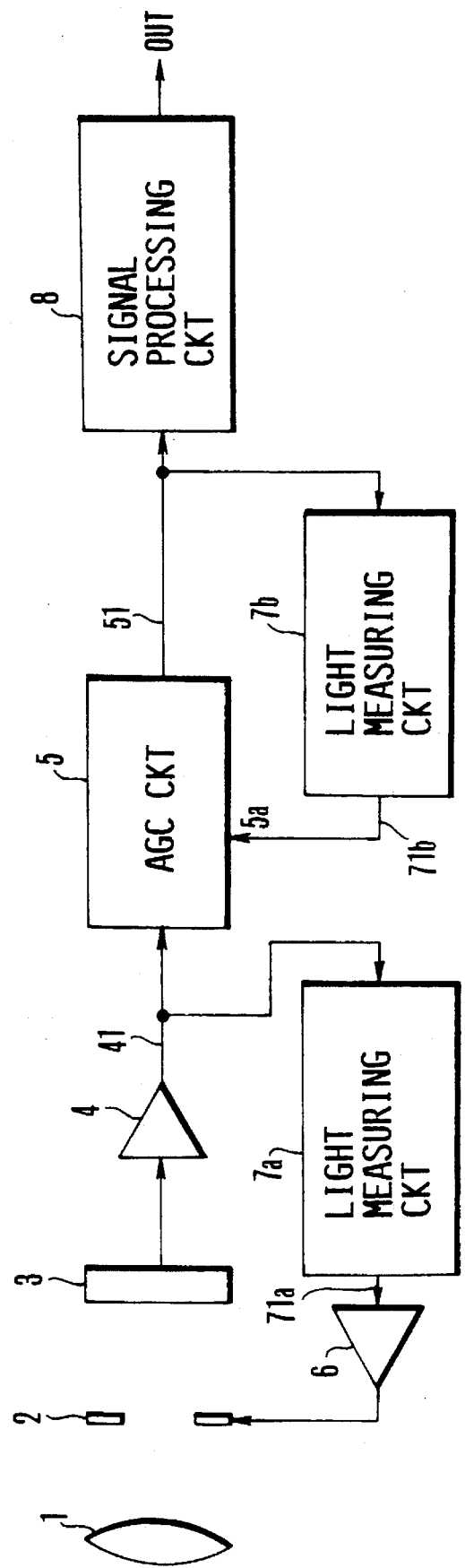
FIG. 1 is a block diagram showing the arrangement of the conventional exposure control device.
Figure 2:
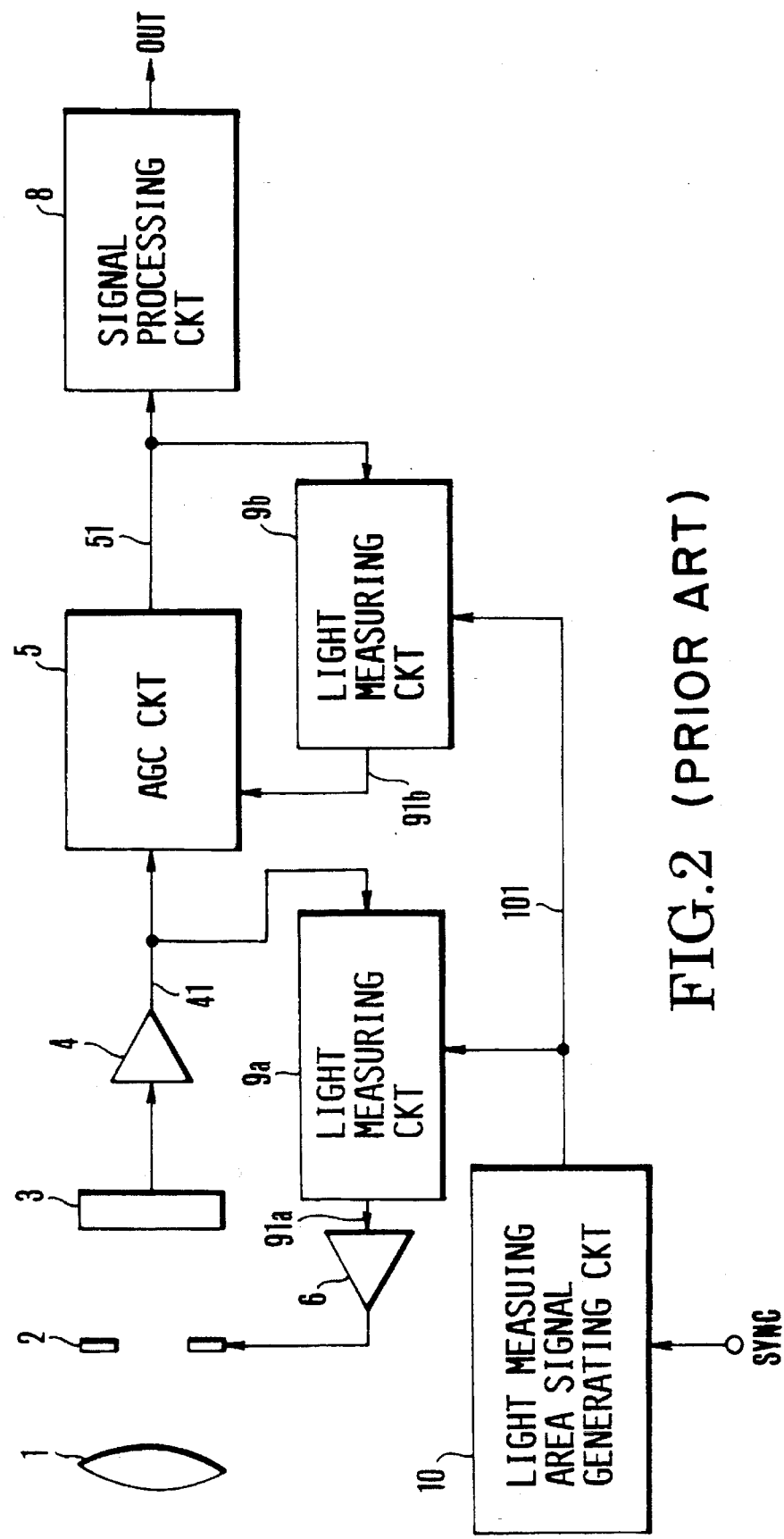
FIG. 2 is a block diagram showing the arrangement of an exposure control device which is an improvement in the device of FIG. 1.
Figure 3:
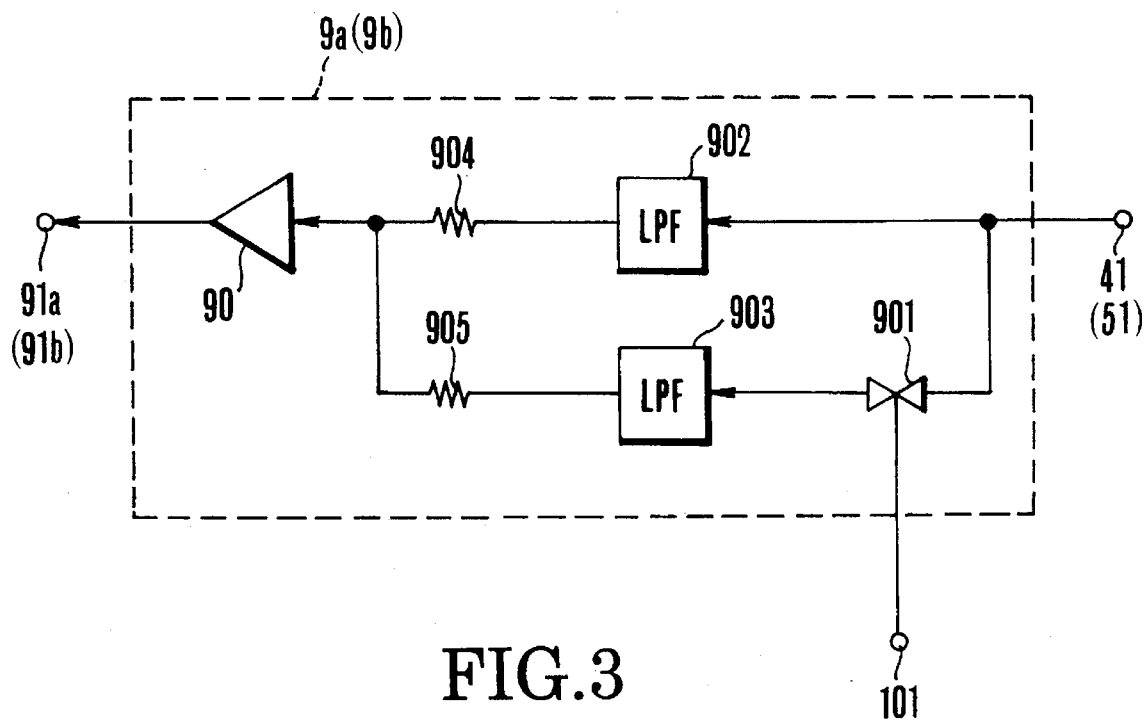
FIG. 3 is a block diagram showing the internal arrangement of a light measuring area signal generating circuit which is included in FIG. 2.
Figure 5:
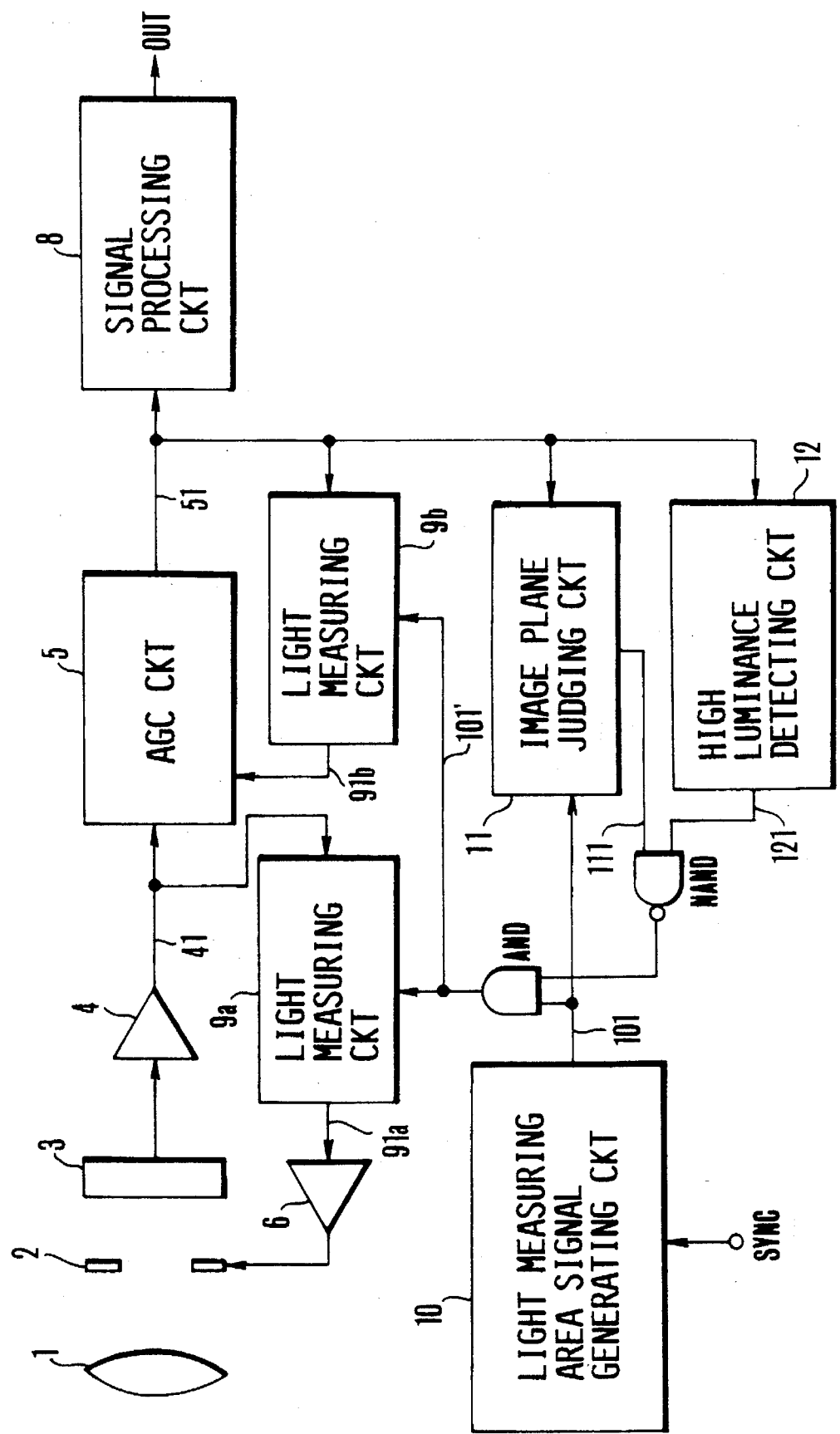
FIG. 5 is a block diagram showing an exposure control device which is arranged according to this invention as an embodiment thereof.

DETAILED DESCRIPTION OF THE PREFERRED EMBODIMENTS:

The details of an exposure control device arranged as an embodiment of this invention are as described below with reference to FIGS. 5 to 8:

FIG. 5 is a block diagram showing an exposure control system of a video camera to which the exposure control device arranged according to this invention is applied. The same component parts as those of the related prior art shown in FIGS. 1 to 3 are indicated by the same reference numerals and the details of them are omitted from the following description.

Referring to FIG. 5, an image plane judging circuit 11 is arranged to receive a light measuring area setting gate signal 101 output from a light measuring area signal generating circuit 10 and a video signal 51 output from an AGC circuit 5 and to produce a control signal 111 according to the result of comparison made between average levels of the video signal 51 output, for example, at the high and low level parts of the gate signal 101 obtained during one field period. In other words, referring to FIG. 8 which shows an image sensing plane 300, this means that the average level of a video signal corresponding to the inside of a light measuring area 302 set on the image sensing plane 300 is compared with the average level of a video signal corresponding to an area located outside of the light measuring area 302. The image sensing plane is judged to be in a normal light condition when the average video signal level of the light measuring area 302 is higher than that of the outside area and even when the former is lower than the latter as long as the difference thus found is less than a predetermined value; and is judged to be in a back light condition if the former is lower than the latter and the difference exceeds the predetermined value.

A high luminance detecting circuit 12 is arranged to receive the video signal 51 output from the AGC circuit 5 and to compare it with a predetermined level. When a luminance component of the signal which is higher than the level is detected, the high luminance detecting circuit 12 produces a control signal 121 at a high level.

The control signals 111 and 121 which are output from the image plane judging circuit 11 and the high luminance detecting circuit 12 are respectively supplied to the input gates of a NAND circuit NAND. The output of the NAND circuit NAND is supplied to one of the input gates of an AND circuit AND. To the other input gate of the AND circuit AND is supplied the gate signal 101 which is output from the light measuring area signal generating circuit 10. The output of the AND circuit AND is produced as a gate signal 101' and is supplied to light measuring circuits 9a and 9b respectively to be used as a control signal for an analog switch 901. The light measuring area setting gate signal 101 of the light measuring area signal generating circuit 10 is thus controlled by the AND circuit AND and the NAND circuit NAND before it is supplied to the light measuring circuits 9a and 9b respectively.

Figure 6:
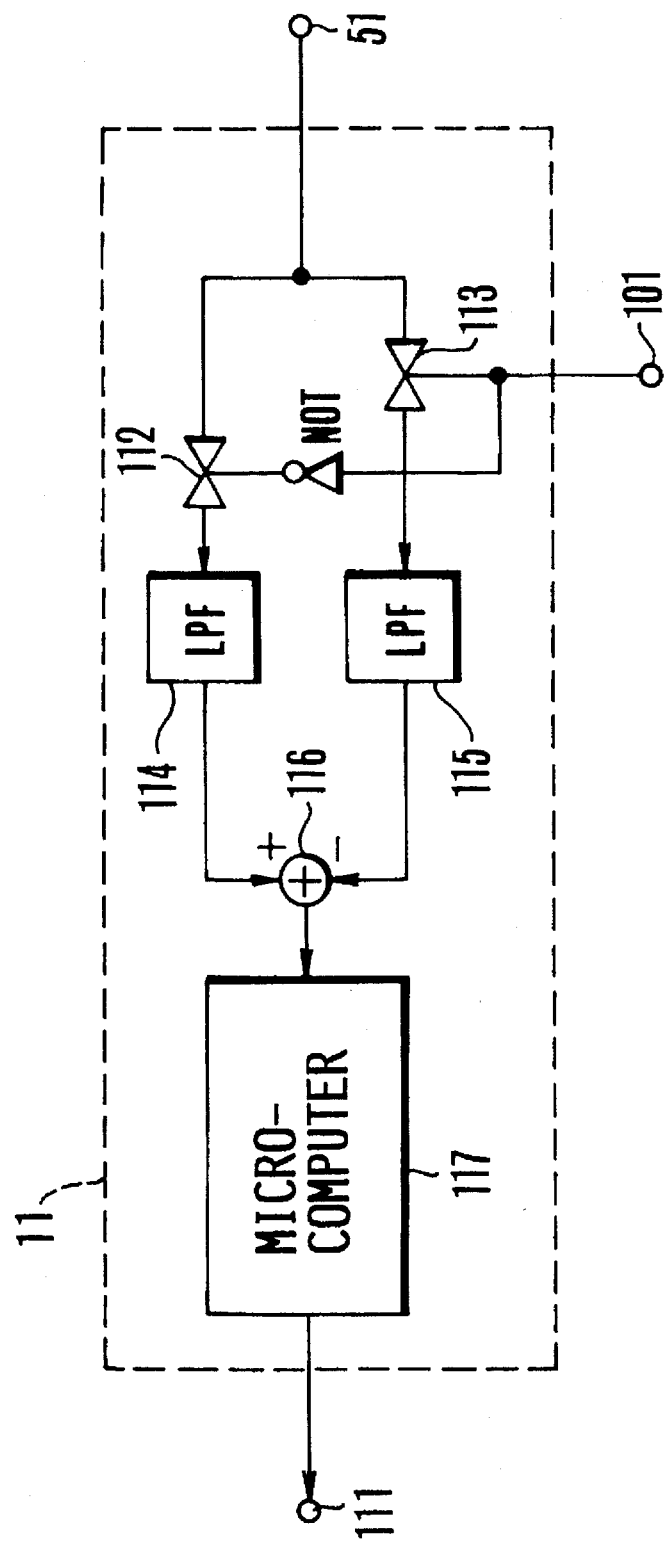
FIGS. 6 and 7 are block diagrams respectively showing the internal arrangements of an image plane judging circuit and a high luminance detecting circuit which are included in the embodiment shown in FIG. 5.

An example of the internal arrangement of the image plane judging circuit 11 is as shown in FIG. 6. Referring to FIG. 6, the video signal 51 is supplied via analog switches 112 and 113 respectively to low-pass filters 114 and 115. The analog switch 113 is closed when the light measuring area setting signal 101 is at a high level. Meanwhile, since the analog switch 112 is arranged to receive the light measuring area setting signal 101 via an inversion circuit NOT, the analog switch 112 is closed when the signal 101 is at a low level. The low-pass filter 115 outputs an average value of the signal obtained from the inside of the light measuring area 302. The low-pass filter 114 outputs an average value of the signal obtained from the outside of the light measuring area 302. A subtracter 116 computes and obtains a difference between the two average values. The output of the subtracter 116 is supplied to a microcomputer 117 to undergo a predetermined computing process. A photographing scene is judged to be a back light scene, if the signal level of the inside of the light measuring area 302 is lower than the signal level of the outside of the area 302 by more than a predetermined value. In this instance, the image plane judging signal 111 is produced at a high level. If not, it is judged to be a normal light scene and the signal 111 is produced at a low level.

Figure 7:
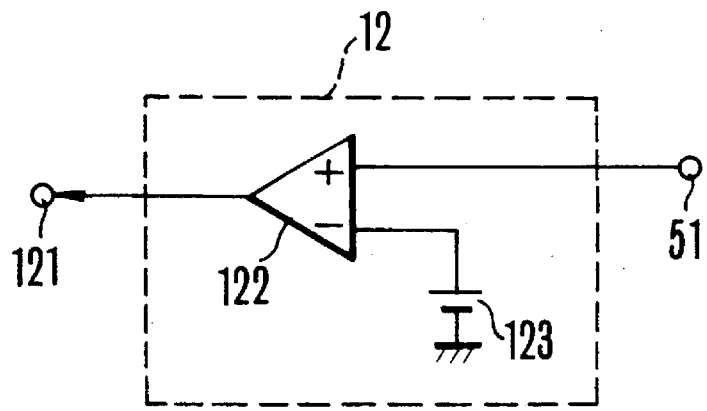

An example of the internal arrangement of the high luminance detecting circuit 12 is as shown in FIG. 7. Referring to FIG. 7, a comparator 122 is arranged to produce a high luminance detecting signal 121 at a high level if the video signal output from the AGC circuit 5 is found to exceed a predetermined voltage value. If not, the signal 121 is produced at a low level.

Figure 8:
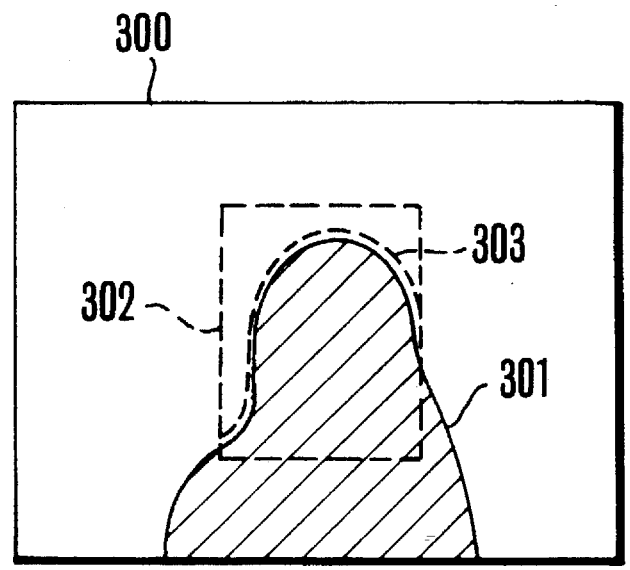
FIG. 8 is an illustration of an image sensing plane showing the operation of the device arranged according to this invention.

Referring to FIG. 8, with the embodiment arranged as described above, the light measuring area 302 is set on the image sensing plane 300 by the light measuring area signal 101 output from the light measuring area signal generating circuit 10, normally in a manner as shown in FIG. 8. The embodiment then performs weighted light measurement on the basis of the level of the video signal corresponding to the inside of the light measuring area 302. At the same time, the image plane judging circuit 11 compares the average video signal level of the inside of the area 302 with that of the outside of the area 302. The level of the image plane judging signal 111 becomes low when the signal level of the inside of the light measuring area 302 is higher than the signal level of the outside of the area 302 and even when the former level is lower than the latter if the signal level difference is below a predetermined value. In other words, the signal 111 is produced at a low level for a normal light image plane. In this instance, the level of one of the input gates of the NAND circuit NAND becomes low. Accordingly, the output level of the NAND circuit NAND then becomes high irrespective of the output of the high luminance detecting circuit 12 to render thereby the AND circuit AND conductive. The AND circuit AND then produces its output signal 101' in the same state as the light measuring area setting signal 101. The signal 101 is thus supplied as it is to both the light measuring circuits 9a and 9b. By this, the light measuring area 302 is set on the image sensing plane 300.

In a case where the image plane judging circuit 11 finds the average video signal level of the outside of the light measuring area 302 is higher by more than the predetermined value than the signal level of the inside of the light measuring area 302, thus indicating a back light image plane having the background brighter than the object 301 by a degree exceeding the predetermined value, the level of the image plane judging signal 111 becomes high. This causes the level of one of the input gates of the NAND circuit NAND to become high. Therefore, when the level of the high luminance detecting signal 121 becomes high with a high luminance part detected on the image sensing plane, the output level of the NAND circuit NAND becomes low. The level of one of the input gates of the AND circuit AND thus becomes low to make its output level also low. Therefore, the light measuring area setting signal 101 is not supplied to the light measuring circuits 9a and 9b even when the signal 101 is supplied from the light measuring area signal generating circuit 10 to the AND circuit AND. As a result, the area from which the high luminance part is detected by the high luminance detecting circuit 12 is excluded from the light measuring area.

Therefore, in a case where the image plane shown in FIG. 8 is in a back light condition for the object 301, the high luminance part which corresponds to the background is normally excluded from the light measuring area 302. Then, the light measuring area eventually becomes an area 303 which corresponds to the object 301 as indicated by a one-dot-chain line. Light measurement is thus performed with weight attached to the light measuring area 303, so that the iris 2 and the AGC circuit 5 can accurately be controlled and compensated for the back light condition. Further, it goes without saying that the light measuring circuits 9a and 9b are similarly controlled simultaneously by one and the same light measuring area setting signal 101 (or 101').

The embodiment is thus arranged to be capable of accurately performing weighted light measurement according to the frame-weighted light measuring method even in cases where there is a high luminance part within the light measuring area under a back-light condition, so that the AGC circuit 5 can accurately be controlled as well as the iris 2, which is controlled via the iris driving circuit 6.

The exposure control device arranged according to this invention as described in the foregoing operates as follows: The condition of the image plane is detected through an average level difference between the video signals obtained from the inside and the outside of the light measuring area (or a light measuring frame). A high luminance part of the image sensing plane is also detected. In carrying out light measuring with weight attached to the light measuring area under a back light condition, a high luminance part of the light measuring area is excluded from the light measuring action. This arrangement effectively prevents any abrupt signal level drop even when a high luminance light source or the like comes into the light measuring area. Further, in a case where a high luminance background part comes into the light measuring area with the object to be photographed being small in size relative to the light measuring area, the device is capable of making stable and natural exposure compensation, so that the image of the object can be prevented from becoming dark all over.

FIGS. 9 to 13 shows second and third embodiments of this invention. In the cases of these embodiments, the exposure control device is provided with: light measuring means which is arranged to attach weight to an average value of a video signal corresponding to a predetermined area set on an image sensing plane and that of a video signal corresponding to the whole image sensing plane and to perform light measurement on the basis of the result of an adding operation on these weighted average values; judging means which is arranged to detect a difference in average signal level between video signals corresponding to the inside and the outside of the predetermined area; and means for varying the value of the weight to be attached to each of these average values on the basis of the output of the judging means. The arrangement enables the device to carry out exposure control always in a most apposite manner irrespective of the state of the image sensing plane, such as a normal light state, a back light state, etc.

Figure 9:
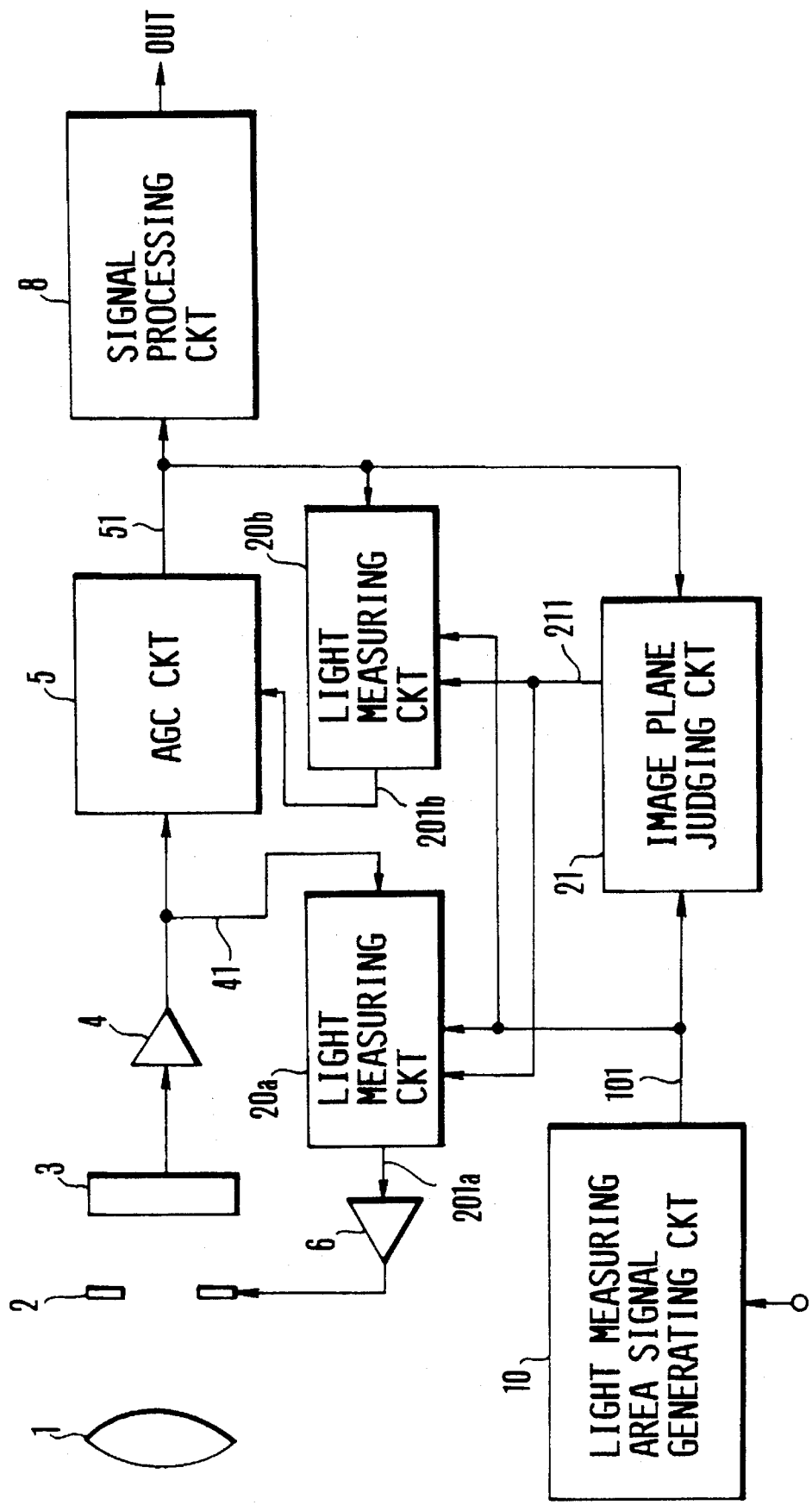
FIG. 9 is a block diagram showing an exposure control device which is arranged as another embodiment of this invention.

FIG. 9 is a block diagram showing the exposure control device which is arranged as the second embodiment of the invention. In FIG. 9, the same component parts as those of the first embodiment described in the foregoing are indicated by the same reference numerals and the de-tails of them are omitted from the following description.

Figure 4:
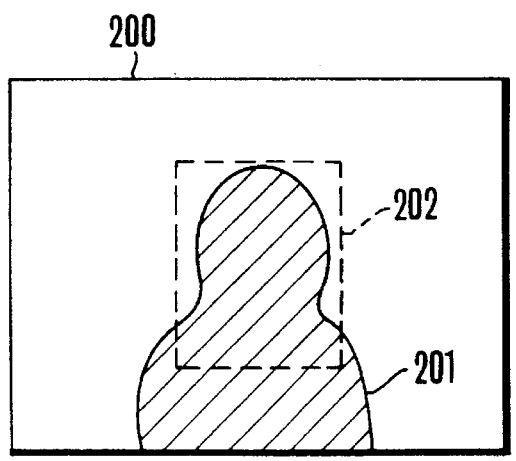
FIG. 4 is an illustration for explaining a condition on an image sensing plane.

Referring to FIG. 9, a light measuring circuit 20a is arranged to receive the video signal 41 from the buffer amplifier 4 and to control the iris 2 via the iris driving circuit 6 in such a way as to keep the video signal 41 constant. A light measuring circuit 20b is arranged to receive the video signal 51 from the AGC circuit 5 and to keep the video signal 51 constant by controlling the gain of the AGC circuit 5. An image plane judging circuit 21 is arranged to compare with each other the average levels of video signals corresponding to the inside and the outside of a light measuring area 202 set on the image sensing plane 200 of FIG. 4 and to judge a condition of the image plane on the basis of a level difference thus detected. The result of judgment by the circuit 21 is produced as a signal 211 and supplied to the light measuring circuits 20a and 20b Then, at the light measuring circuits 20a and 20b, the values of weight to be attached to the average levels of video signals corresponding to the whole image sensing plane 200 and to the inside of the light measuring area 202 are respectively controlled in accordance with an image plane judging signal output from the circuit 21 as will be further described later.

Figure 10:
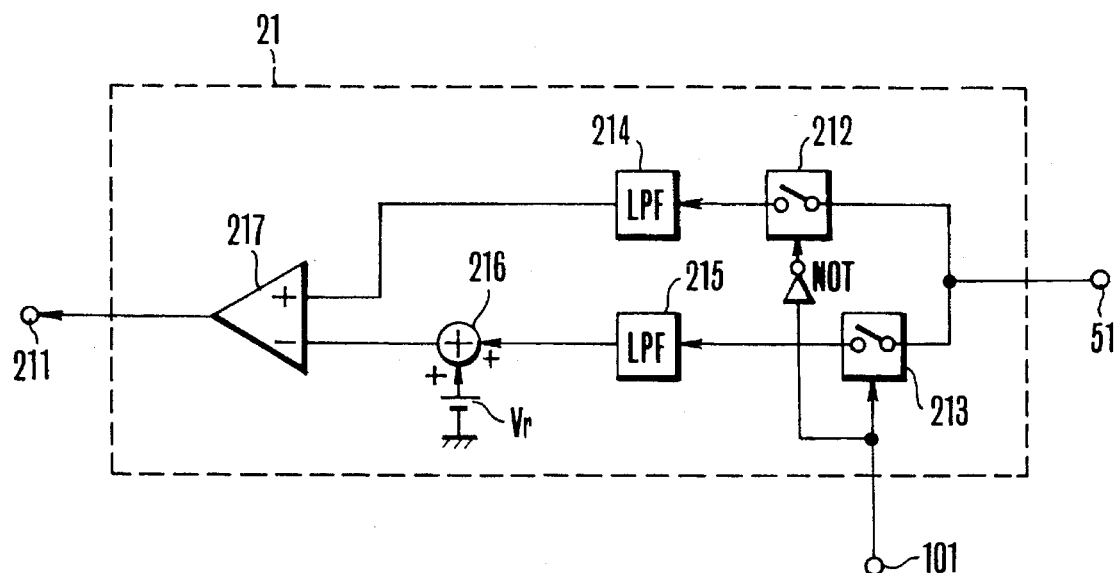
FIG. 10 is a block diagram showing the internal arrangement of an image plane judging circuit included in FIG. 9.

FIG. 10 is a block diagram showing the internal arrangement of the image plane judging circuit 21. Referring to FIG. 10, analog switches 212 and 213 are arranged to operate under the control of the light measuring area setting signal 101. The light measuring area setting signal 101 is supplied to the analog switch 212 via an inversion circuit NOT. The inversion circuit NOT is thus arranged to have the switches 212 and 213 to be closed and opened in a converse relation. Video signals which are output through these switches 212 and 213 are averaged for a predetermined period of time by means of low-pass filters 214 and 215.

More specifically, when the light measuring area setting signal 101 is at a high level, the switch 213 is closed and the switch 212 is opened as the signal 101 is inverted to a low level by the inversion circuit NOT. Under this condition, the signal corresponding to the inside of the light measuring area is supplied to the low-pass filter 215. When the light measuring area setting signal 101 is at a low level, the switch 213 is opened while the switch 212 is closed as the signal 101 is inverted to a high level by the inversion circuit NOT. In this instance, therefore, the signal corresponding to the outside of the light measuring area is supplied to the low-pass filter 214.

The image plane judging circuit 21 includes an adder 216; a reference voltage source Vr which has its voltage set at a predetermined level; and a comparator 217. The output of the low-pass filter 214 which is a signal representing the average level of the whole image sensing plane is arranged to be applied to the positive input terminal of the comparator 217. The output of the low-pass filter 214 which is a signal obtained with the voltage of the reference voltage source Vr added as a bias voltage to a signal representing the average image signal level of the light measuring area is applied to the negative input terminal of the comparator 217. The comparator 217 compares these inputs and produces a signal 211 as the result of comparison. The signal 211 is supplied to the light measuring circuits 20a and 20b. The signal level which is obtained by adding the voltage of the reference voltage source Vr to the output of the low-pass filter 215 to give a predetermined bias is thus compared with the level of the signal output from the low-pass filter 214. This means that a level difference between the output signal of the filter 214 and that of the low-pass filter 215 is compared with the voltage value of the reference voltage source Vr and the result of this comparison is produced as the signal 211.

In a case where the output level of the low-pass filter 215 is higher than the output level of the other low-pass filter 215 and the level difference is greater than the voltage value of the reference voltage source Vr, it indicates a back light image plane where the luminance of the background is higher than the average luminance obtained within the light measuring area 200 (object's luminance) and the luminance difference between the object and the background is higher than the predetermined voltage level. In this case, the output of the comparator 217 which is the image plane judging signal 211 is produced at a high level.

If the difference between the output level of the low-pass filter 214 and that of the low-pass filter 215 is less than the voltage level of the reference voltage source Vr or if these two output levels are equal to each other, it indicates a normal light image plane or a minor back light image plane which can be handled in the same manner as in the case of a normal light image plane. In that instance, the comparator 217 produces the image plane judging signal 211 at a low level.

The image plane judging signal 211 is supplied to the light measuring circuits 20a and 20b. This signal 211 is then used for controlling the weight attaching addition value to be applied to the signals corresponding to the inside and the outside of the light measuring area as will be described later herein.

Figure 11:
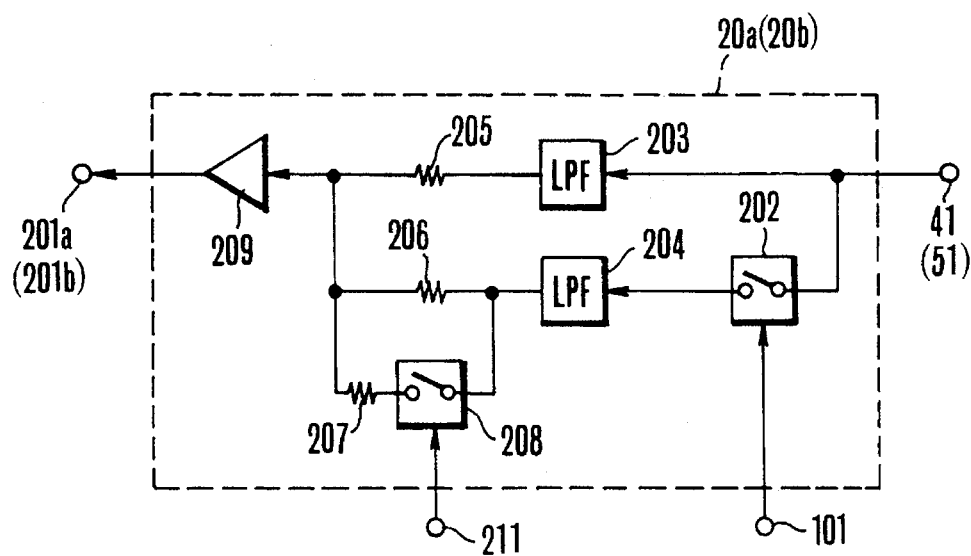
FIG. 11 is a block diagram showing the internal arrangement of a light measuring circuit included in FIG. 9.

FIG. 11 is a block diagram showing the internal arrangement of the light measuring circuits 20a and 20b. Referring to FIG. 11, the video signal 41 or 51 output from the buffer amplifier 4 or the AGC circuit 5 is supplied to a low-pass filter 203 and also to another low-pass filter 204 via an analog switch 202. The analog switch 202 is arranged to open and close under the control of a light measuring area setting signal 101 output from the light measuring area signal generating circuit 10. The switch 202 closes when the signal 101 is at a high level to allow the video signal corresponding to the light measuring area of the image sensing plane to pass and to be supplied to the low-pass filter 204. The low-pass filter 203 is thus arranged to produce an average video signal level which is obtained by averaging a video signal corresponding to the whole image plane. Meanwhile, the other low-pass filter 204 is arranged to produce an average video signal level which is obtained by averaging a video signal corresponding to the light measuring area. The outputs of the low-pass filters 203 and 204 are weighted through resistors 205 and 206 respectively. After that, they are added together and supplied to a buffer amplifier 209. Further, the resistor 206 which is disposed on the output side of the low-pass filter 204 is parallel connected to a series circuit consisting of a resistor 207 and an analog switch 208 which is arranged to open and close under the control of the image plane judging signal 211 of the image plane judging circuit 21. (The switch 208 closes when the image plane judging signal 211 is at a high level.) The resistance value on the output side of the low-pass filter 204 is thus arranged to vary accordingly as the analog switch 208 opens or closes. This arrangement permits adjustment of the weight attaching addition value to be applied to the output of the low-pass filter 203. In other words, the output of the low-pass filter 204 which represents the average video signal level corresponding to the inside of the light measuring area is determined by the resistor 206 alone when the analog switch 208 is opened and is determined by the parallel circuit consisting of the resistors 206 and 207 when the analog switch 208 is closed.

In cases where there obtains an ordinary normal light image plane having the average video signal level of the background area around the light measuring area lower than the average video signal level of the inside of the light measuring area 202 set on the image sensing plane 200 and also in cases where there obtains a slightly back light image plane having the average video signal level of the outside of the light measuring area higher than that of the inside of the light measuring area but having the signal level difference below a predetermined value (the voltage value of the reference voltage source Vr), the image plane judging circuit 21 produces the image plane judging signal 211 at a low level. In that case, the analog switch 208 of each of the light measuring circuits 20a and 20b is opened. Then, the degree of weight to be attached when the average video signal of the inside of the light measuring area output from the low-pass filter 204 is added to that of the outside of the area is determined by the resistor 206 alone. Therefore, the average video signal of the whole image sensing plane output from the low-pass filter 203 and the average video signal output from the low-pass filter 204 are added together with weight attached to them by the resistors 205 and 206. With the results of addition thus output respectively from the light measuring circuits 20a and 20b, the iris 2 and the AGC circuit 5 are controlled by them.

Meanwhile, in a case where the average video signal level of the background area located outside of the light measuring area is higher than that of the inside of the light measuring area on the image sensing plane and that the level difference between them is greater than the predetermined value (the voltage of the voltage source Vr), the image plane judging circuit 21 produces the image plane judging signal 211 at a high level. In that case, the analog switch 208 of each of the light measuring circuits 20a and 20b is closed. The weight to be attached, at the time of addition, to the average image signal of the inside of the light measuring area output from the low-pass filter 204 is then determined by the parallel circuit consisting of the resistors 206 and 207. Therefore, the resistance value becomes smaller than in the case of the above-stated normal light condition. Then weight attached value of the output signal of the low-pass filter 204 to be added to the output of the low-pass filter 203 becomes larger. As a result, a greater weight is attached to the average video signal level of the inside of the light measuring area than to the average video signal level of the whole image plane.

As described above, a condition of the image sensing plane is judged from the relation of the video signal levels of the inside and the outside of the light measuring area to the reference bias voltage. The light measuring operation is performed by changing the weighted light measuring characteristic for the light measuring area from one characteristic over to the other according to the condition of the image plane thus judged. This arrangement enables the embodiment to perform light measuring operation in a manner most apposite to any of the various image plane conditions including a normal light condition and a back light condition.

Figure 12:
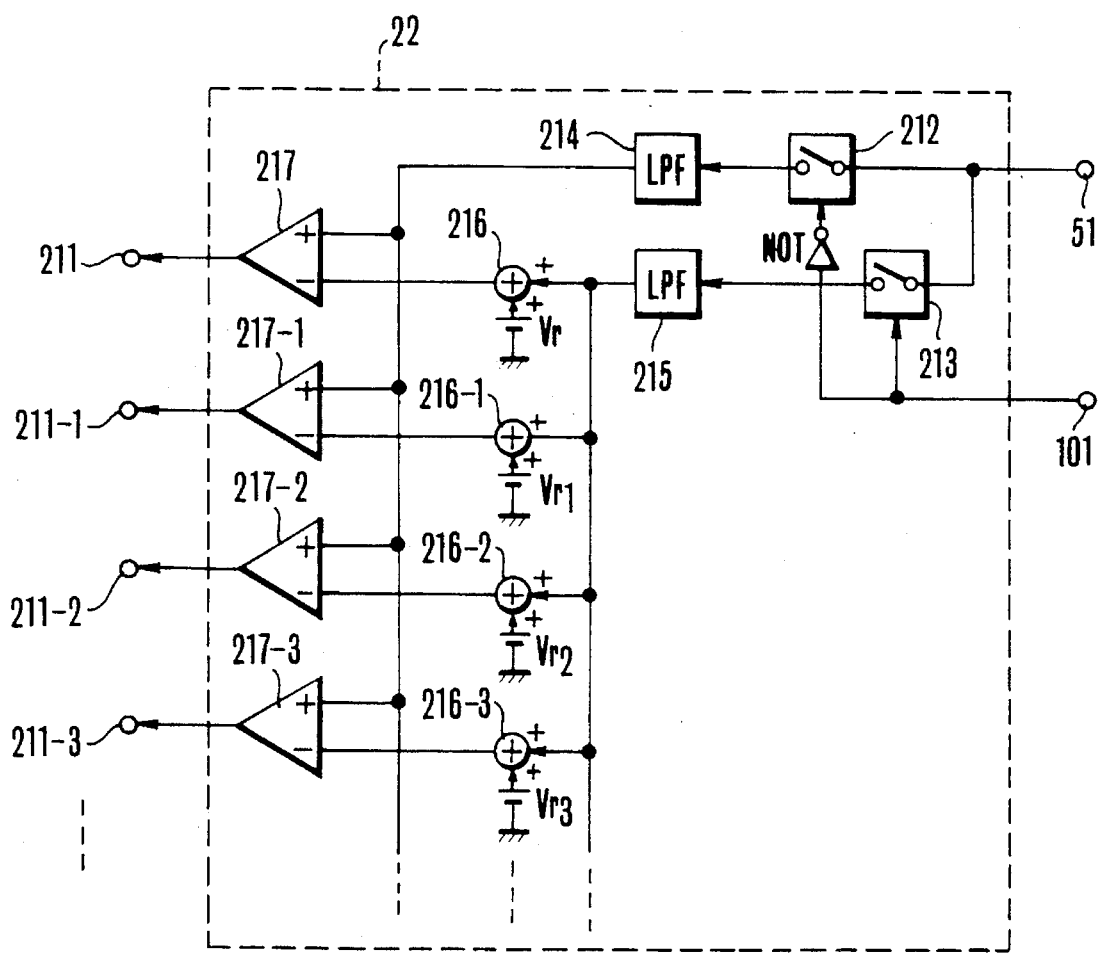
FIGS. 12 and 13 are block diagrams showing an image plane judging circuit and a light measuring circuit which are respectively arranged as other embodiments of the invention.
Figure 13:
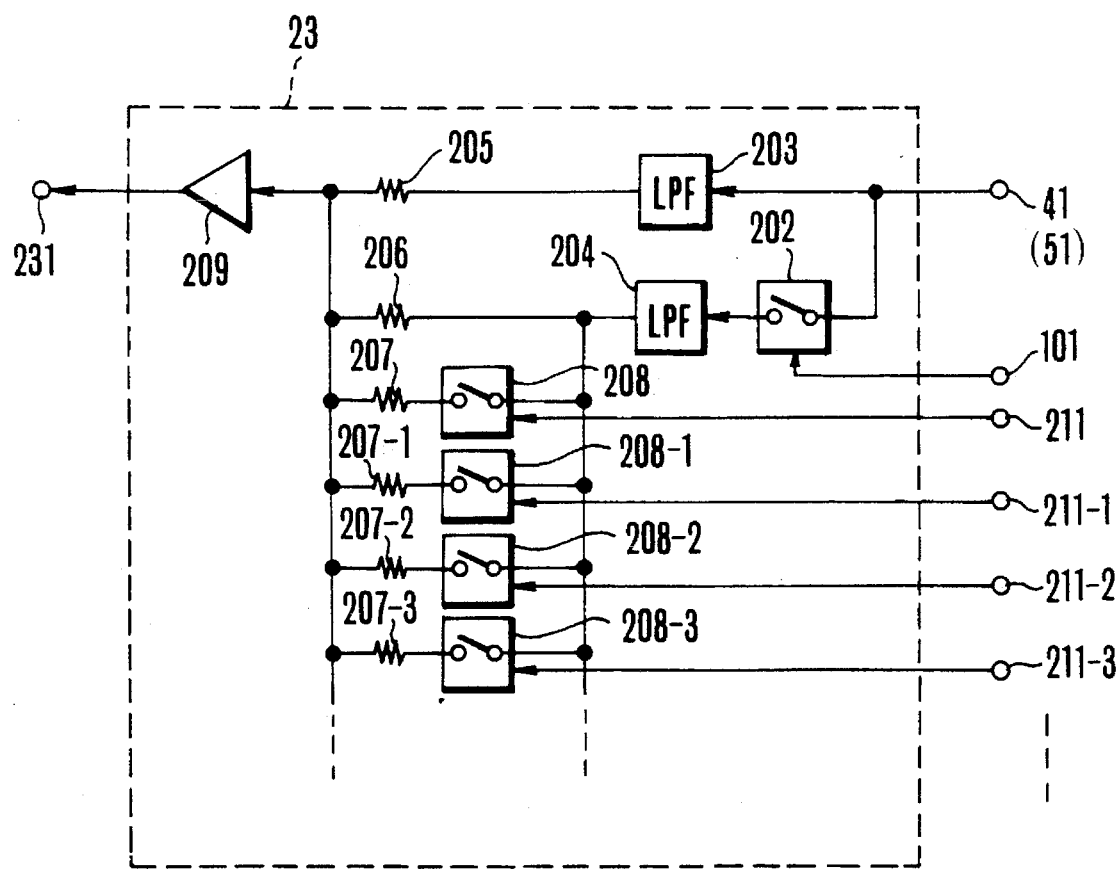

FIGS. 12 and 13 are block diagrams showing modifications of the image plane judging circuit and the light measuring circuit as a third embodiment of the invention. While the image plane judging circuit and the light measuring circuits 20a and 20b of the embodiment described in the foregoing are arranged to perform the weight attaching control in two steps, the third embodiment is arranged to perform light measurement control in a more accurate and improved manner. In each of these drawings, the same component parts as those of FIGS. 9 to 11 are indicated by the same reference numerals and the details of them are omitted from description.

FIG. 12 shows an image plane judging circuit 22. To detect the signal level difference between the average video signals of the inside and the outside of the light measuring area set on the image sensing plane in a more finely divided manner, the circuit 22 is provided with the following additional component parts including comparators 217-1, 217-2 and 217-3; adders 216-1, 216-2 and 216-3; and reference voltage sources Vr1, Vr2 and Vr3. The voltage sources Vr, Vr1, Vr2 and Vr3 are arranged to have voltages of stepwise varied values. Therefore, the comparators 217, 217-1, 217-2 and 217-3 have different threshold values according to the voltage source corresponding to them. These comparators are thus arranged to produce image plane judging signals 211, 211-1, 211-2 and 211-3 in a stepwise manner according to the video signal level difference between the inside and the outside of the light measuring area.

FIG. 13 shows a light measuring circuit 23. In addition to the resistor 207 and the analog switch 208 of FIG. 11, the circuit 23 is provided with additional component parts including analog switch 208-1, 208-2 and 208-3 which are arranged to be opened and closed by the outputs 211-1, 211-2 and 211-3 of the image plane judging circuit 22; and resistors 207-1, 207-2 and 207-3. The analog switches 208, 208-1, 208-2 and 208-3 are arranged to close when the image plane judging signals 211, 211-1, 211-2 and 211-3 are produced at high levels respectively. These switches are respectively series-connected to corresponding resistors 207, 207-1, 207-2 and 207-3 which are parallel connected to the resistor 206. The light measuring circuit 23 which is arranged in this manner is capable of more finely varying the weight to be attached to the average video signal output from the low-pass filter 204 in a stepwise manner.

With the third embodiment arranged in the manner as described above, a condition of the image sensing plane can be more finely detected and the exposure control can be accomplished with an increased degree of accuracy.

As described in the foregoing, the exposure control device according to this invention is characterized in the following arrangement: In performing weighted light measurement with weight attached to a light measuring area set on the image sensing plane on the basis of the average video signal level of the light measuring area and that of the whole image sensing plane, a condition of the image sensing plane is judged according to an average luminance difference between the inside and the outside of the light measuring area. The weight to be attached to these average video signal levels are variable on the basis of the condition of the image sensing plane thus judged. Therefore, the exposure control can be always most appositely accomplished under all conditions including a normal light condition, a back light condition, etc. Unlike the conventional device, the invented device obviates the possibility of giving such an unnatural image plane that results from attaching weight to the average video signals of the inside and the outside of the light measuring area always in the same and fixed manner irrespective of varied image plane conditions including a normal light condition and a back light condition. The invented device is, therefore, capable of always adequately accomplishing exposure control.

What is claimed is:

1. An exposure control device comprising:

a) image sensing means for outputting an image signal corresponding to a sensed image;

b) area setting means for a setting a predetermined light measuring area on a part of an image sensing plane of said image sensing means;

c) exposure control means for controlling an exposed state of said image sensing means by using an image signal corresponding to the inside of said light measuring area;

d) high luminance detecting means for detecting a high luminance part on said image sensing plane on the basis of said image signal;

e) judging means for judging a photographing condition of said image sensing plane; and f) control means for controlling said area setting means on the basis of outputs of said high luminance detecting means and said judging means so as to set said light measuring area on said image sensing plane without said high luminance part detected by said high luminance detecting means in the case that said judging means judged said photographing condition being a predetermined condition.

2. A device according to claim 1, wherein said exposure control means includes iris means for controlling a quantity of light incident on said image sensing means and is arranged to keep a level of said image signal constant by controlling an aperture area of said iris means.

3. A device according to claim 2, wherein said exposure control means includes an automatic gain control (AGC) circuit inserted in a route of said image signal.

4. A device according to claim 1, wherein said judging means for judging the photographing condition on said image sensing plane on the basis of image signals corresponding to the inside and the outside of said light measuring area.

5. A device according to claim 4, wherein said judging means is arranged to detect a back light image plane on the basis of a difference between average levels of image signals corresponding to the inside and the outside of said light measuring area.

6. A device according to claim 5, wherein said average levels are average levels of signals obtained during one field period.

7. A device according to claim 5, wherein said control means is arranged to cause said area setting means to exclude said high luminance part detected by said high luminance detecting means to set said light measuring area for exposure control when said image sensing plane is judged to be a back light image plane by said judging means.

8. A device according to claim 7, wherein said judging means is arranged to compare an average signal level of an image signal of the inside of said light measuring area with that of the outside of said light measuring area and to judge said image sensing plane to be a back light image plane when the signal level of the outside of the light measuring area is greater than the signal level of the inside of he light measuring area by not less than a predetermined value.

9. A device according to claim 8, wherein said judging means includes a gate circuit for separating from each other the image signals of the inside and the outside of said light measuring area, low-pass filters for averaging the image signals of the inside and the outside of said light measuring area respectively, and a microcomputer for judging a condition of said image sensing plane on the basis of outputs of said low-pass filters.

10. A device according to claim 8, wherein said high luminance detecting means is arranged to judge a part of said image signal having a signal level greater than a predetermined threshold value to be said high luminance part.

11. A device according to claim 10, wherein said high luminance detecting means includes a comparator for comparing the signal level of said image signal with said threshold value.

12. A device according to claim 1, wherein said image sensing means is a CCD image sensor.

13. A light measuring device for measuring light on the basis of an image signal corresponding to a light measuring area set on an image sensing plane, comprising:

a) area setting means for setting said light measuring area on a part of said image sensing plane;

b) judging means for judging a condition on said image sensing plane;

c) high luminance detecting means for detecting a high luminance part on said image sensing plane on the basis of said image signal; and d) control means for compensating said light measuring area by controlling said area setting means according to an output of said judging means and that of said high luminance detecting means.

14. A device according to claim 13, further comprising exposure control means for controlling an exposed state of said image sensing plane on the basis of an image signal corresponding to the inside of said light measuring area.

15. A device according to claim 14, wherein said exposure control means includes iris means for controlling a quantity of light incident on said image sensing means and is arranged to keep a level of said image signal constant by controlling an aperture area of said iris means.

16. A device according to claim 15, wherein said exposure control means includes an automatic gain control (AGC) circuit inserted in a route of said image signal.

17. A device according to claim 13, wherein said judging means is arranged to detect a back light image plane on the basis of a difference between average levels of image signals corresponding to the inside and the outside of said light measuring area.

18. A device according to claim 17, wherein said judging means is arranged to compare with each other average levels of image signals of the inside and the outside of said light measuring area and to judge said image sensing plane to be a back light image plane when the signal level of the outside of said light measuring area is greater than the signal level of the inside of said light measuring area by not less than a predetermined value.

19. A device according to claim 18, wherein said judging means includes a gate circuit for separating the image signals of the inside and the outside of said light measuring area from each other, low-pass filters for averaging the image signals of the inside and the outside of said light measuring area respectively, and a microcomputer for judging a condition of said image sensing plane on the basis of outputs of said low-pass filters.

20. A device according to claim 14, wherein said control means is arranged to cause said area setting means to exclude said high luminance part detected by said high luminance detecting means to set said light measuring area for exposure control when said image sensing plane is judged to be a back light image plane by said judging means.

21. A device according to claim 13, wherein said high luminance detecting means is arranged to judge a part of said image signal having a signal level greater than a predetermined threshold value to be said high luminance part.

22. A device according to claim 21, wherein said high luminance detecting means includes a comparator for comparing the signal level of said image signal with said threshold value.

23. A light measuring device for measuring light on the basis of an image signal corresponding to a light measuring area set on an image sensing plane, comprising:

a) area setting means for setting said light measuring area on a part of said image sensing plane;

b) high luminance detecting means for detecting a high luminance part on said image sensing plane on the basis of said image signal;

c) judging means for judging a photographing condition on said image sensing plane;

d) correcting means for correcting said light measuring area by controlling said area setting means according to outputs of said high luminance detecting means and said judging means; and e) exposure control means for controlling an exposure condition on the basis of the image signal corresponding to said light measuring area corrected by said correcting means.

24. A device according to claim 23, wherein said exposure control means controls the exposure condition of said image sensing plane on the basis of the image signal corresponding to the inside of said light measuring area.

25. A device according to claim 24, wherein said exposure control means includes iris means for controlling a quantity of light incident on said image sensing means and is arranged to keep a level of said image signal constant by controlling an aperture area of said iris means.

26. A device according to claim 25, wherein said exposure control means includes an automatic gain control (AGC) circuit inserted in a route of said image signal.

27. A device according to claim 23, wherein said exposure control means includes judging means for detecting a back light image plane on the basis of a difference between average levels of image signals corresponding to the inside and the outside of said light measuring area.

28. A device according to claim 27, wherein said judging means is arranged to compare with each other average levels of image signals on the inside and the outside of said light measuring area and to judge said image sensing plane to be a back light image plane when the signal level of the outside of said light measuring area is greater than the signal level of the inside of said light measuring area by not less than a predetermined value.

29. A device according to claim 28, wherein said judging means includes a gate circuit for separating the image signals of the inside and the outside of said light measuring area from each other, low-pass filters for averaging the image signals of the inside and the outside of said light measuring area respectively, and a microcomputer for judging a condition of said image sensing plane on the basis of outputs of said low-pass filters.

30. A device according to claim 27, wherein said correcting means is arranged to cause said area setting means to exclude said high luminance part detected by said high luminance detecting means to set said light measuring area for exposure control when said image sensing plane is judged to be a back light image plane by said judging means.

31. A device according to claim 23, wherein said high luminance detecting means is arranged to judge a part of said image signal having a signal level greater than a predetermined threshold value to be said high luminance part.

32. A device according to claim 31, wherein said high luminance detecting means includes a comparator for comparing the signal level of said image signal with said threshold value.

* * * * *

UNITED STATES PATENT AND TRADEMARK OFFICE
CERTIFICATE OF CORRECTION

PATENT NO. : 5,565,918
DATED : October 15, 1996
INVENTOR(S) : Homma et al.

It is certified that error appears in the above-identified patent and that said Letters Patent are hereby corrected as shown below:

| | | | | | |
|---|---|---|---|---|---|
| Col. 3, | line 24, | delete | "there-fore" | and insert | -- therefore --. |
| Col. 3, | line 25, | delete | "expo-sure" | and insert | -- exposure --. |
| Col. 3, | line 29, | delete | "pro-vide" | and insert | -- provide --. |
| Col. 3, | line 30, | delete | "per-forming" | and insert | -- performing --. |
| Col. 4, | line 57, | delete | "per-forming" | and insert | -- performing --. |
| Col. 4, | line 61, | delete | "prefer-red" | and insert | -- preferred --. |
| Col. 8, | line 17, | delete | "With" | and insert | -- with --. |
| Col. 8, | line 52, | delete | "de-tails" | and insert | -- details --. |
| Col. 13, | line 37, | delete | "he" | and insert | -- the --. |

Signed and Sealed this

Second Day of June, 1998

Attest:

BRUCE LEHMAN

*Attesting Officer*   *Commissioner of Patents and Trademarks*